United States Patent
Schwenck et al.

(10) Patent No.: US 7,065,656 B2
(45) Date of Patent: Jun. 20, 2006

(54) TAMPER-EVIDENT/TAMPER-RESISTANT ELECTRONIC COMPONENTS

(75) Inventors: Gary Schwenck, Rochester, NY (US); Mark Corio, Rochester, NY (US); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 09/897,416

(22) Filed: Jul. 3, 2001

(65) Prior Publication Data

US 2003/0009683 A1    Jan. 9, 2003

(51) Int. Cl.
*G06F 11/30*    (2006.01)
(52) U.S. Cl. ......................................... 713/194; 726/34
(58) Field of Classification Search ................ 713/194, 713/200; 726/34
See application file for complete search history.

(56) References Cited

U.S. PATENT DOCUMENTS

| | | | |
|---|---|---|---|
| 4,262,329 A | | 4/1981 | Bright et al. |
| 4,634,807 A | * | 1/1987 | Chorley et al. ............... 705/55 |
| 4,799,258 A | | 1/1989 | Davies |
| 4,845,632 A | * | 7/1989 | Kroll et al. .................. 705/405 |
| 5,136,647 A | | 8/1992 | Haber et al. |
| 5,861,662 A | * | 1/1999 | Candelore ................... 257/679 |
| 6,069,563 A | * | 5/2000 | Kadner et al. .............. 340/571 |
| 6,120,907 A | * | 9/2000 | Tahon et al. ................. 428/426 |
| 6,470,449 B1 | * | 10/2002 | Blandford .................... 713/178 |

FOREIGN PATENT DOCUMENTS

| | | |
|---|---|---|
| EP | 0422757 A2 | 4/1991 |
| EP | 0624014 A2 | 11/1994 |
| EP | 0860882 A2 | 8/1998 |
| EP | 0972632 A1 | 1/2000 |
| FR | 2 593 950 | 2/1986 |
| WO | 92/12485 | 7/1992 |

* cited by examiner

*Primary Examiner*—Hosuk Song
*Assistant Examiner*—Jacob Lipman

(57) ABSTRACT

A tamper evident electronic module comprises an electronic component, a tamper evident sheet, and encapsulant material. Said component is encapsulated in the encapsulant material and the sheet overlies the component, and the sheet comprises a flexible multi-layer sheet, a plurality of the layers of the sheet being selected from the group below:
(i) an electromagnetic radiation shield layer;
(ii) a tell-tale electrically conductive trip wire defining a convoluted meandering pathway on the layer, the trip wire meandering in a pattern which substantially covers the electronic component in a space filled area if the layer;
(iii) a layer having the features of (ii), and in which the pathway comprises a fractual pattern;
(iv) a layer having the features of (ii), and in which a second tell-tale trip wire extends alongside a first tell-tale trip wire so that they meander as a spaced pair.
(v) an active electromagnetic marking layer adapted to emitt electromagnetic radiation.

22 Claims, 10 Drawing Sheets

TAMPER-EVIDENT/TAMPER-RESISTANT ELECTRONIC COMPONENTS

TECHNICAL FIELD

This invention relates to tamper-evident and/or tamper-resistant electronic components, and to ways of making them, and to applications for such components. It is especially, but not exclusively, concerned with electronic components which store or provide data or information.

Tamper-evident means that it is possible to tell that an attempt to subvert the electronic component, to tamper with it, has been made, preferably that it is relatively easy to tell that a tamper attempt has been made. The attempt to tamper may or may not be successful: but a tamper-evident device will have its integrity questioned if it shows signs of tampering. Tamper-resistant means that the component is difficult to tamper with, or that it has been designed to resist tampering in at least one way. Neither tamper-evident nor tamper-resistant mean that a component cannot be tampered with.

The invention has arisen out of the area of timestamping an electronic document with a time in such a way that there is a high degree of confidence that the document was really timestamped at the indicated time and that the time has not been forged. Since the invention arose from such considerations it will be described in that context, but it will be appreciated that it has wider applicability to other areas where it is desired to provide a tamper-evident and/or tamper-resistant component, circuitry, or device.

BACKGROUND ART

It is known in the field of timestamping documents to send a digest or fingerprint of document to be timestamped over the internet to a Trusted Clock—a clock whose integrity can be relied upon (for example relied upon in a court of law). The Trusted Clock then timestamps the digest, crypotographically digitally signs the digest (for example by producing a hash or second digest of the document digest plus time stamp and then encrypting it) and sends the signed and hashed fingerprint or document/digest, back over the internet to the person who requested that the digest be signed. The signing process typically involves encrypting data, often using the PKI infrastructure. Thus the signature, and the evidential reliability of the document and timestamp are time-limited to when the cryptographic keys time expire in reliability (the Certification Authority typically puts a limit on the time for which they say their keys are safe, before they cannot be certain enough that someone could not decrypt encrypted messages without the key). This may result in the need to have a, timestamped signed digest timestamped and signed again, using newer encryption keys before the expiry of the older encryption certificate keys.

This need, and the general rise in Internet traffic, and the rise and projected rise in the requirement to timestamp documents or digests of documents with a reliable time, means that there is likely to be increasingly large demands on the Internet telecommunication pathways, and upon the usage of Trusted Clocks.

Documents or digests of documents that are timestamped need not be share trades, tenders for tendered work, or other "high level" sensitive document digests, but are increasingly more mundane things such as a digest of the log of when a monitored door is opened and closed, and who opened and closed it (e.g. secure doors requiring swipe cards or other user identification means). Connecting a door sensor/actuator to the Internet can be expensive and awkward, as can connecting other sensor/or control devices to the Internet.

It is known for people to try to determine the structure and operational capabilities, and software used, in someone else's microchip, or printed circuit board (PCB) in order to break the law For example in order to bypass security provisions in order to perpetrate criminal activities such as industrial espionage, or even fraud or theft. Internet fraud and computer hacking is a growing problem. Bank fraud and the breaching of the security of computer systems is a growing problem. In some cases changing the time on an electronic record, e.g. putting the clock back, can be used in fraud. For example such "spoofing" of systems can mislead third parties into trusting something they should not trust. It is undesirable to have anyone subverting the function of an electronic device in an undetected manner.

It is known to encase microchips, PCB's or other electronic devices in a polymer matrix to hinder their physical inspection. It is known to shield electronic components electromagnetically in order to prevent the leakage of electromagnetic radiation out from a device (the leaking out of information), and to prevent a device being subjected to incoming e.m. radiation, e.g. probing a device with a prompt and seeing what its responses are, in order to deduce things about the device.

It is known to provide an electronic component such as a microchip and/or a PCB with electronic monitoring to establish whether an attempt to interfere with the component is being made. However, it can be relatively straightforward to avoid the known security systems, for example using a drill to drill down into the component, possibly after X-raying the component to learn more of its structure before drilling.

It is known to have flexible circuit boards where a printed circuit board is printed onto a flexible unitary homogenous sheet of Mylar plastics material.

DISCLOSURE OF THE INVENTION

It is an aim of at least one embodiment of the invention to reduce the need for Internet usage in order to access a Trusted Clock.

It is an aim of at least one embodiment of the invention to provide a tamper-evident/and or tamper-resistant electronic component.

It is an aim of at least one embodiment of the present invention to make it harder to drill into an electronic component to modify it, without the attempt to modify the component being detected. It is an aim of another embodiment of the invention to make it harder to analyse an electronic component, especially undetected.

It is an aim of another embodiment of the invention to provide a Trusted Clock, or a Trusted data store.

According to a first aspect the invention comprises an electronic module having an outer surface and having an electronic component, encapsulant material, and a tamper-evident and/or tamper-resistant barrier: wherein said electronic component is encapsulated in said encapsulant, and said tamper-evident and/or tamper-resistant barrier is disposed between said outer surface of said module and said electronic component and comprises at least a first tamper-detecting layer and a second tamper-detecting layer, said first layer comprising a first sheet element adapted to be monitored by a sensor communicable with said sheet element, said first sheet element having a detectable characteristic detectable by the sensor, said characteristic being detectably different when said first sheet element is whole and unbreached in comparison with when said first sheet element has been holed or otherwise physically breached; and wherein said second layer also comprises a sheet element, a second sheet element, adapted to be monitored by a sensor, said second sheet element having a detectable characteristic detectable by the sensor, said characteristic being detectably different when said second sheet element is whole and unbreached in comparison with when said second sheet element has been holed or otherwise physically breached.

There may be a third, or a plurality of further layers, each of which may comprise a sheet element having a detectable characteristic which changes when the sheet is holed or breached.

The barrier may comprise a multi-layer flexible sheet. By flexible is meant flexible enough to deform under its own weight—i.e. non-self supporting when held horizontally. The sheet may be floppy. It may be about as flexible as a sheet of standard A4 paper, or as the plastics material used for supermarket carrier bags, or about as flexible as flexible circuit boards. The layers of the flexible sheet may comprise plastics materials, or at least some of them may. Mylar is a suitable plastics material. A material that does not shrink or otherwise change in shape or size with time is advantageous, as is a material that can carry a metal layer or film, and a material that will not react badly with the encapsulant. The material of the layers is preferably electrically insulating.

The flexible barrier sheet may have layers having a thickness in the range $1/1000$–$30/1000$ inch or more; more preferably in the range to $2/1000$ to $20/1000$ inch or more, and in one embodiment has a thickness of about $2/1000$–$5/1000$ inch, for example $3/1000$ inch. The overall sheet may have a thickness of $5$–$100/1000$ inch or more, depending on the number of layers. The sheet may have a thickness of >0.2 mm, preferably between 0.2 mm and about 1 mm.

The tamper-detecting layers of the barrier flexible sheet may be bonded together, preferably over substantially the whole of their face-to-face contact. They may be thermally bonded. Alternatively, they may not be bonded together directly, and may be free floating, at least before encapsulation.

Said first and second layers may have a lead connectable to the sensor (s) to which they are adapted to be communicated. Said lead may comprise an electrical pathway.

At least one of said layers preferably comprises a tell-tale pathway adapted in use to carry a signal. The pathway may comprise a meandering convoluted pathway which traverses a substantial part of the surface area of the sheet element that carries it, and which may also cover a substantial fraction of the surface area of the sheet that carries it. The pathway may traverse over substantially the whole of the sheet that carries it and/or may cover about half, or about ⅓ to ⅔, of the surface area of the sheet that carries it.

The pathway may comprise a space-filling pattern. The pathway may comprise a fractal pattern. These are less predictable than regular patterns. The fractal pattern may be a space-filling fractal, such as a Peano fractal.

The pathway may have an overall, general, directionality. There may be a first sheet having a first pathway and a second sheet having a second pathway superposed upon said first sheet in plan view. The first and second pathways may be superposed in a manner such that the pathways are not exactly superposed one upon the other for a substantial part of their length, instead being offset or mis-aligned in plan view.

The offset may be a linear offset, or an angular offset, or both. In one preferred embodiment a first layer having a first track has a track with a general directionality extending in a first direction, and a second layer with a second track having a general directionality extending in a second, different, direction. The first and second layers may be adjacent to each other in the barrier, or they may not be adjacent.

The pathway may comprise a narrow wire or filament of electrically conductive material. Alternatively, the pathway may comprise a tape having a discernible width. The width of the tape may be about as wide as a typical, or minimum, gap between physically close portions of the track that are not linearly adjacent each other along the length of the track, the track preferably not touching itself in its meandering. The track is preferably a single continuous elongate electrical pathway.

There may be two, or more, side-by-side tracks which extend over the surface of a common carrier film generally parallel to each other but spaced apart.

There may be encapsulant material, under the barrier, between the barrier and the electronic component, and/or encapsulant material above the barrier. The barrier and electronic component may be encased in encapsulant. The encapsulant may comprise an epoxy material, for example a dark coloured epoxy.

There may be barrier sheet both above and below the electronic component.

The electronic component may comprise a PCB, and the barrier sheet may extend over a substantial part, or substantially the whole of, the PCB.

The module may include one or more sensors for sensing the detectable characteristics of one or more layers of the tamper-evident and/or tamper-resistant barrier, or the sensors may be outside of the module. Preferably the sensors are embedded in the encapsulant.

The sensor(s) may detect the presence or absence of a signal on a track. The sensor(s) may detect a voltage or current in a sheet element. Preferably the module includes a comparator adapted to compare a detected characteristic with an expected characteristic or with a reference. The comparator may be adapted to produce a marker or alarm signal if it detects an unacceptable comparison result.

Preferably the module includes a signal generator adapted to generate signals and to pass them through an input sheet element of at least one layer, and a detector detecting the output from an output adapted to detect whether the output of the output sheet element is as expected. The signals are preferably unpredictable in nature, so that an observer cannot predict what they will be. The signals may be random, pseudo random, or noise-like. The signal generator may be a noise generator or a pseudo random signal generator. The input and output sheet element could comprise the same sheet element, the detector detecting whether the signals input into the sheet element are coming out from it as expected. The detector could include a comparator to compare the input and output from a sheet element. The signal generator could produce a time varying signal, which may vary at a frequency of the order of thousands of Hz, or tens of thousands of Hz, or even higher.

The input sheet element and the output sheet element could be different sheet elements. For example, a signal could be input into one sheet element and transmitted to another sheet element if a gap between them is breached by a conductive tool during an attach on the module, or if a screen between them is broken.

Monitoring that a received signal is as expected does not necessarily mean monitoring that it is the same as what was input. The detected signal may be expected to be zero (e.g. twin-track electrical pathways with the signal in one track and not in the other, and detecting whether a bridging attack tool communicates the signal to the other track). The signal may be expected to suffer a predetermined change or degradation (e.g. attenuation, power loss, phase shift, etc, and the improvement of the signal beyond what is expected, or its over—degradation, may be indicative of tampering.

Another reason for having an element in the sheet into which a signal is injected or introduced is to hide any electromagnetic (e.m.) signals produced by the protected electronic component (e.g. a circuit board). There may be a masking emitter layer in the sheet adapted to emit electromagnetic radiation to mask the e.m. emissions of the protected electronic component. For example the power of the e.m. signals deliberately emitted by the masking layer could be significantly greater than that emitted by the protected electronic component. The power of e.m. radiation at the frequency range emitted by a protected electronic component (e.g. PCB) could be a factor of 2, 5, 10, 50, 100, 1000, 10000, or more less than the emissions emanating from the masking layer (active masking) when observed from outside the electronic component module. The masking emissions could be in the same general frequency range as those emitted by the protected electronic component. This may make it difficult for an external listener to differentiate the "real" e.m. signals from the electronic component of interest and those of the masking layer. The masking layer may generate noise, or noise-like signals, and/or it may generate a spoof signal which is intended to mask the true e.m. emissions of the electronic component of interest. The masking layer could comprise an antenna or emitter, for example a convoluted wire, for example having a free end and a signal-injection end communicated with a signal injector (e.g. on a PCB board).

It is preferred to have an e.m. shield layer, such as an earth plate layer, between an active e.m. emitter/masking layer and the electronic component. This is so that the electronic component does not suffer from interference from the masking e.m. emitter layer, and also to further attenuate e.m. signals from the electronic component.

It will be appreciated that the masking layer, which could be thought of as an active e.m. emitting layer, could comprise the same formations as a telltale trip wire. The same metal track could serve as both a trip wire with signals in it being maintained for proper transmission through the track, and it could also serve as an active e.m. emitter—a current in a wire does cause the emission of e.m. waves. The same signals in the wire could both cause the emission of electromagnetic waves to mask the spectrum being emitted by the protected electronic component and also be the signals that are checked to ensure that they are received as expected.

Instead of, or in addition to, having one or more sensors in the module itself, the module may have an extra-module communicator capable of communicating with an external monitor. For example the module may have an electrical connector connectable with an external sensor or processor. Alternatively it may have a wireless transmitter to communicate with an external device.

The barrier sheet may not have its layers bonded to each other. They could be separate layers, possibly free floating relative to each other. Encapsulant may conceivably be provided between two layers of the barrier sheet.

The module preferably has a power source, preferably encased in the encapsulant.

The module may have a sheet of frangible material.

The barrier sheet may have a central, main body portion extending in a general plane, but preferably not precisely in a single plane, and may have one or more side portions extending transversely away from the general main plane of the body portion to cover side regions of the electronic component. An upper barrier sheet may cover the upper plan surface area of the electronic component, and a lower barrier sheet may cover the lower plan surface area of the electronic component. Between them, the upper and lower barrier sheet may cover some or all of the sides of the electronic component, and may substantially enclose the electronic component in a container of barrier sheet. The container may comprise more than one separate barrier sheet or it may be a single sheet folded about the component.

The sheet of frangible material (if provided) may contact and overlie said encapsulant material and overlie said component, said sheet being sufficiently thin that it is likely to crack or break if an attempt is made to drill or cut through it with a laser drill. The frangible material may comprise a sheet of glass. The frangible material may have a thickness no thicker than about $1/10$ of an inch, or no thicker than about $1/20$ of an inch, or no thicker than about $1/100$ of an inch. The sheet of frangible material may have a thickness of about $3/1000$ of an inch thick, or less.

The sheet of frangible material may have a diffusive layer adapted in use to diffuse a laser beam so as to reduce the energy intensity of the light which passes through said sheet. The diffusive layer may comprise an etched surface of said sheet. The sheet may have a reflective layer adapted in use to reflect at least a substantial part of the light of an incident laser beam. The sheet of frangible material preferably has both a reflective layer adapted in use to reflect at least a substantial part of the light of an incident laser beam and a diffusive layer adapted in use to diffuse an incident laser beam so as to reduce the energy intensity of a beam which passes the diffusive layer, said reflective layer being disposed between said encapsulant material and said diffusive layer. Encapsulant is preferably sandwiched between two spaced apart said frangible sheets.

The electronic module may have the encapsulant containing said electronic component sandwiched between an upper and lower spaced apart sheets of glass with said encapsulant being in face to face contact with an inner face of each said sheet of glass, and at least one tamper-evident electronic element may be provided in said encapsulant material between said upper sheet and said electronic component and at least another tamper-evident electronic element is provided in said encapsulant material between said lower sheet and said electronic component. The upper and lower sheets of glass are preferably covered by a protective obscurant.

The encapsulant material includes chemical signature molecules.

The frangible sheet may be treated so as to cause it to be diffusive. It may be etched, ground or roughened.

According to a second aspect the invention comprises a multi-layer tamper-evident and/or tamper-resistant barrier sheet having a plurality of layers, and wherein said layers are selected from the group comprising: (i) an electromagnetic screen layer, preferably a continuous sheet or film of conductive material, such as metal:
  (ii) a tell-tale trip wire layer;
  (iii) a tell-tale trip wire layer in which the trip wire meanders over the surface of the layer in a space-filling pattern;
  (iv) the layer (iii), with the pattern being a fractal pattern;
  (v) a multi-track layer having at least a first and second track spaced apart and extending generally parallel to each other and meandering as a pair over the surface of the multi-track layer.

(vi) an active electromagnetic emission masking layer adapted in use to emit masking electromagnetic waves.

Preferably the barrier sheet comprises a unitary body, with its layers being bonded together, preferably over substantially their whole surface area. They may be glued or fused, e.g. heat-fused, together.

Preferably the barrier sheet is flexible, preferably flexible enough so as to be non-self supporting when held horizontally. It may be about as flexible as a sheet of standard A4 paper such as the US PTO prints its patents upon.

Preferably the barrier sheet has a contact tail which has electrically conductive formations adapted to contact each layers of the sheet with an appropriate electrical sensor.

The layers of the sheet preferably comprise insulating plastics material layers which carry conductive films or traces.

Each layer in the barrier sheet may have a thickness of about no more than 10 thousandth of an inch (or between. 1 and 100 thousandth of an inch).

The barrier sheet may have at least 3, 4, 5, or more layers, typically bound together.

Preferably the barrier sheet includes at least two of layers (i), and/or at least two layers from the group (ii), (iii), (iv) or (v). Preferably the sheet has an internal grouping of layer(s) at least one, and preferably at least two of layers (ii) to (v), sandwiched between two layers (i). The layers sandwiched between the layers of group (i) may be from the same one of groups (ii), (iii), (iv) or (v), or may be provided from more than one group.

The barrier sheet may have a foldable flap or flaps at the periphery of a main central, body portion adapted to cover side portions of an electronic component. The sheet may have a foldable lead tag adapted to fold under a main body portion of the sheet to provide a contact with the electronic component.

According to a third aspect the invention comprises a method of detecting tampering with an electronic component or of resisting tampering with an electronic component comprising protecting said component with an electrically or optically monitored barrier sheet, the barrier sheet having a plurality of tamper-evident and/or tamper-resistant layers which are monitored electronically or optically, and using different kinds of tamper-evident and/or tamper-resistant layer in the barrier sheet.

Preferably the barrier sheet is obscured from view, for example by encapsulating or encasing it and the electronic component in an encapsulant. The sheet may be flexible.

The method may include shielding inner tamper-evident and/or tamper-resistant layers of the barrier sheet from electromagnetic radiation by covering them with a layer of em shielding material, such as a substantially continuous film of metal. The two outermost layers of the barrier sheet (or a spaced pair of layers) may comprise the shielding layers.

The barrier sheet may have its layers imprecisely orientated with respect to each other. They may be linearly offset and/or angularity mis-aligned.

According to another aspect the invention comprises a method of making a tamper-evident and/or tamper-resistant electronic module comprising hiding a least one tamper-evident sheet in a body of encapsulant matrix material so that it overlies an electronic component also hidden in the body, and arranging for the precise position of the sheet in the body to be variable from module to module by one or more of:

(i) imprecisely holding said sheet and said electronic component whilst introducing fluid settable encapsulant material, (ii) introducing imprecise amounts of fluid settable encapsulant material between at least one of said components and said sheet, and/or said sheet and a body-surface defining mould;

(iii) providing a by-pass flow passageway from at least one of: (a) the space between said electronic components and said sheet; and (b) the space between said sheet and a body-surface defining mould; thereby enabling the volume of encapsulant that exists in space (a) and/or space (b) to be variable and imprecisely controlled.

The tamper-evident and/or tamper-resistant sheet may have a hole or passageway through it for the flow of encapsulant material during manufacture of the body. The tamper-evident and/or tamper-resistant sheet may be a sheet in accordance with an earlier aspect of the invention.

There may be more than one sheet provided.

When the sheet is flexible this also provides a variable sheet-other structure space since the flexing of the sheet can take-up/accommodate variations in the amount of encapsulant above and/or below it.

The method may comprise folding portions of the sheet to cover side portions of the electronic component.

One or more of said sheet elements may comprise a substantially continuous layer of metal, possibly a film of metal. This may be an electromagnetic wave filter adapted to screen the passage of electromagnetic waves. Said continuous layer of metal may be arranged to carry a current when breached, for example if a metal tool contacts said continuous metal layer with an electrical current source.

Said detectable characteristic may comprise the current in, or the voltage of, said layer.

DESCRIPTION OF THE DRAWINGS

Embodiments of the invention will now be described by way of example only with reference to the accompanying drawings, of which.

DETAILED DESCRIPTION OF THE INVENTION

Figure 1:
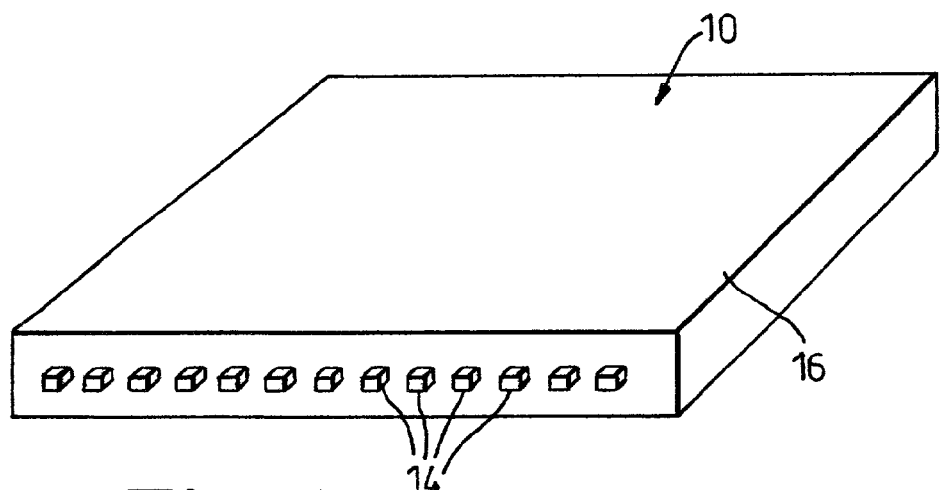
FIG. 1 shows a tamper-evident and/or tamper-resistant electronic data storage or data providing device in accordance with the invention.
Figure 2:
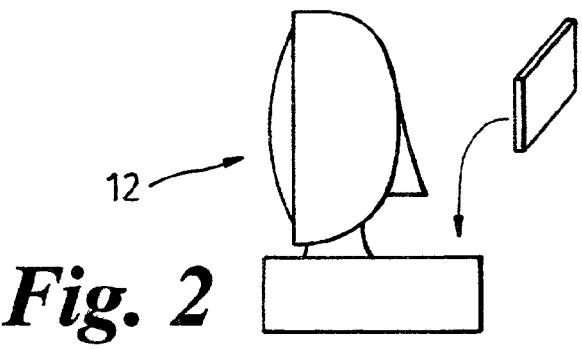
FIG. 2 shows the device of FIG. 1, in this example in the form of a PCI card, or card-equivalent, being introduced into a PC.

FIG. 1 shows a Trusted Clock PCI card 10 for a computer, such as a personal computer 12 shown in FIG. 2. The card 10 is a half-width PCI card having a plurality of connectors 14 projecting from a glass-clad polymer matrix body 16.

The card 10 is about 6 inches×4 inches×½". It has a printed circuit board which carries electronic components such as clock-associated microprocessors a battery and assault sensors. The card 10 also has a thin glass upper sheet and a thin glass lower sheet. The glass of the upper and lower sheets is untoughened stressed glass which cracks or shatters when subjected to too much stress or strain. The glass sheets are in this example about ³⁄₁₀₀₀ of an inch thick and face the polymer matrix body 16, with the glass and polymer matrix in intimate face-to-face contact. The body 16 is made of a black epoxy polymer material such as may be commonly used in the electronics industry as an adhesive for electronic components. The matrix material of the body carries a chemical marker or signature: a substance present, often added specifically, to aid recognition of the matrix material in tests. More than one chemical marker may be present in the matrix material.

The PCB may also carry a digital signer chip or have a chips which can provide a digital signature function.

In use of the card 10 the computer 12 sends via the connectors 14 a digest, hash, or fingerprint of a document to be timestamped to the card 10, (which document may itself be a hash or digest of a larger document) and the clock chips of the card associate a time derived from their clock function with the document, and the digital signer (if provided) signs the timestamped document digest. The signed timestamped document digest, or hash, may be stored on a memory chip (not shown) on the PCB, and/or may be output back to the PC via the connectors 14, preferably after first being encrypted.

The clock of the PCI 10 cannot be altered either (i) at all, or (ii) by unauthorised instructions. The PCI is tamper-evident because of its thin glass sheets, and also because of electrical/electromagnetic tamper-evident features to be described later. If the veracity of the timestamp applied to documents by the PCI 10 is to be established a trusted person, who may be the supplier of the PCI card, physically inspects the card for signs of tampering.

One way of tampering with a PCB or PCI card is to drill into the PCI card and interfere with the circuitry and/or chips on the card. Drills which could be used include mechanical drills, laser beams, and ion beams.

Figure 3:
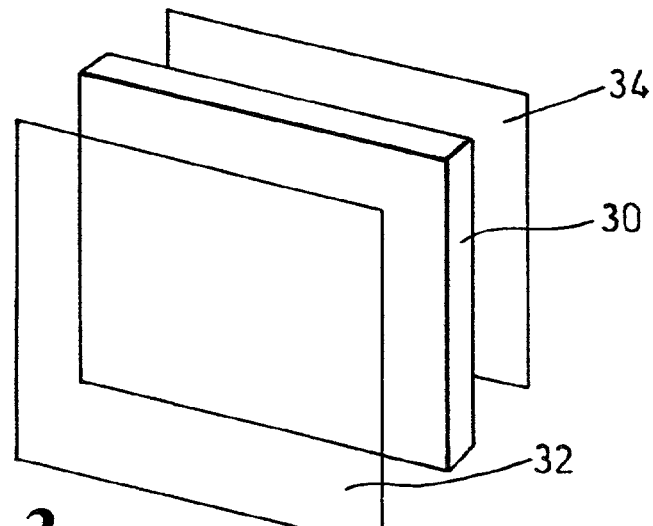
FIG. 3 shows schematically a PCB protected using the present invention.
Figure 4A:
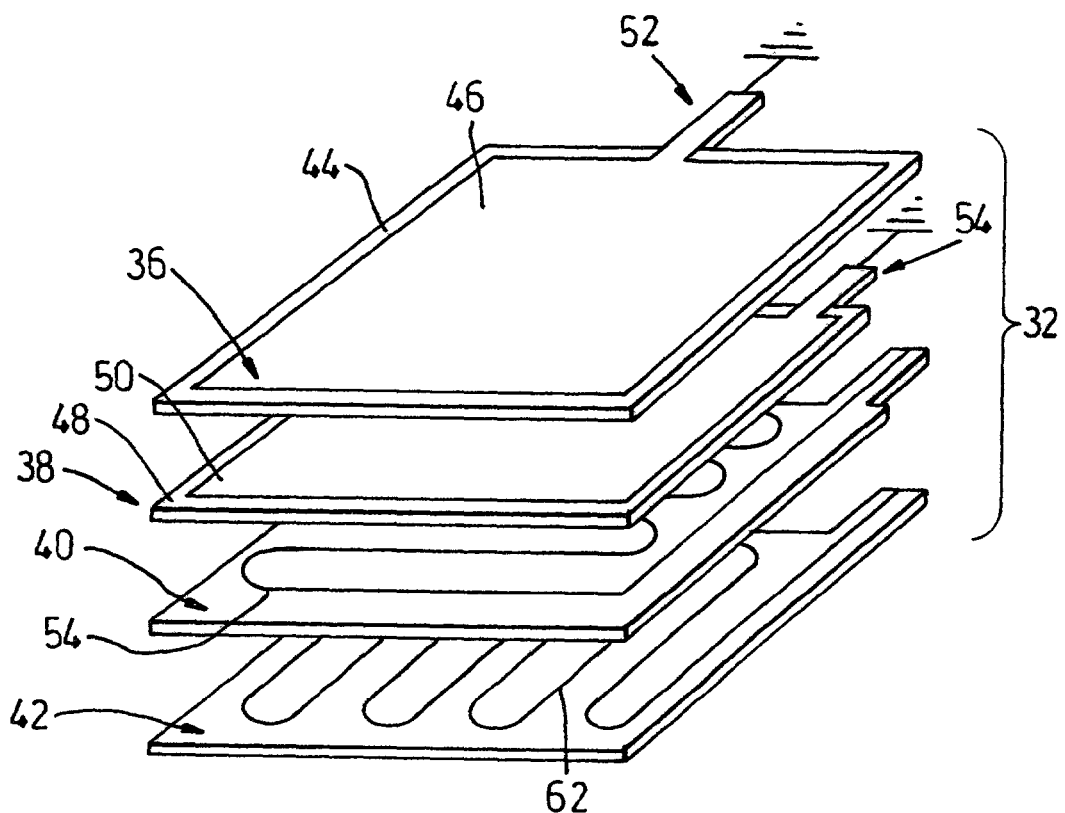
FIGS. 4A and 4B show part of FIG. 3 in more detail, FIG. 4A being an exploded view of FIG. 4B.
Figure 4B:
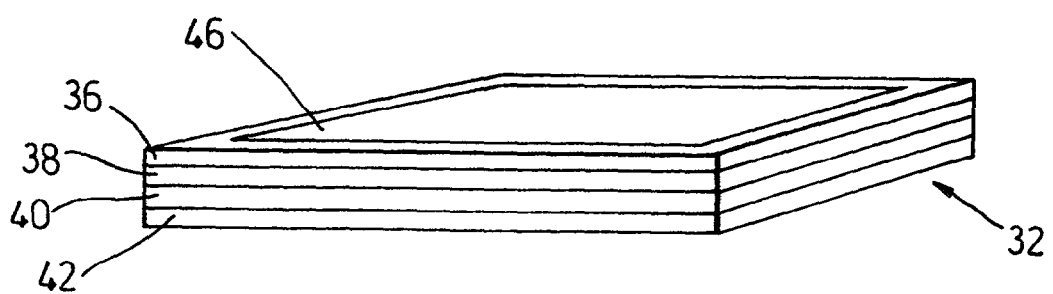

As mentioned above, electronic tamper-evident features are also provided. FIG. 3 shows the printed circuit described above, referenced 30. The PCB 30 is protected by two flexible multi-layer sheets 32 and 34. In this example each of the sheets 32, 34 has four layers 36, 38, 40 and 42, as shown in FIGS. 4A and 4B. Each of the layers 36–42 is a layer of flexible plastics polymer material, e.g. Mylar, printed with an electronic security measure, as will be described. The four layers of each sheet are bonded together. For example they may be fixed together by heat, or bonded using an adhesive. They are joined over substantially the whole of their face-to-face contact.

In a variant they are not bonded together as such, but do overlie each other. They may not be joined to each other directly, or they be joined at less than their whole face to face contact: e.g. they could be spot-bonded at regions and unbonded at other regions.

Figure 5:
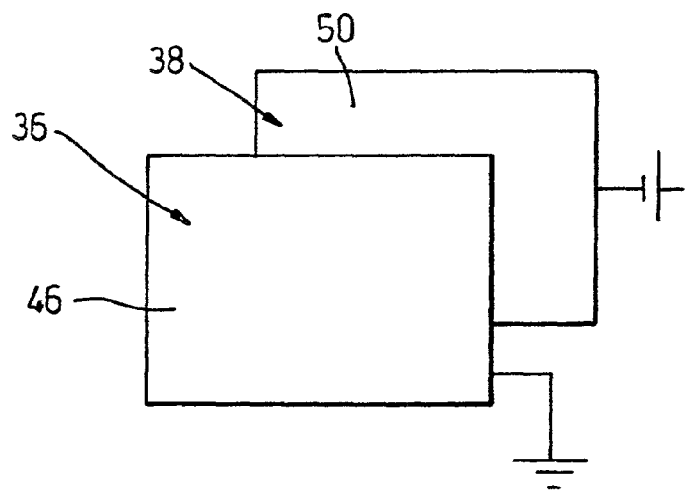
FIGS. 5 to 11 show different layers and sheets for use in the invention.

FIG. 5 shows layers 36 and 38 schematically. Layer 36 has substantially its whole surface area of one face, face 44, coated with a continuous layer or film of copper 46. Layer 38 also has one face, face 48, coated with a continuous layer or film of copper 50. The Mylar material of the layers is, of course, an electrical insulator. The copper film layers 46 and 50 effectively form a pair of metal plates spaced apart by the thickness of the Mylar layer 36. Layers 36 and 38 each have a respective lead formation 52 and 54 which provide an electrical connection for the copper films 46 and 50 to earth and to a low level voltage source, e.g. 5V DC, respectively. The leads comprise continuous extensions of the layers 36 and 38. The leads may be superposed, or they may exit the stack of layers at different positions.

FIG. 5 illustrates the operation of layers 36 and 38. A sensor detects when there is any current flowing between the two plates, and/or any change in voltage. Whilst the layers 36 and 38 remain unattached there is no current flowing between them. If a conductive member (e.g. metal drill or knife) pierces the outer layer 36 and touches the inner layer 38 it will form a bridge between the two electrically conductive copper films 46 and 50, and current will flow. This makes the attack detectable. The grounded plate 46 need not be earthed: it could be at a floating potential. Connecting the two plates 46 and 50 would still cause a current to flow/voltage to change: would still cause a detectable change or effect.

If the result of detecting an attack is that the protected electronic component is deactivated and does not produce the output that used to be a trusted output, then the sheet would provide a tamper-resistant effect; it would resist attempts (as well as evidence them) to subvert the electronic component by causing the component to cease its activity, thereby resisting the output of a subverted, non-trustworthy, output from the component.

Another benefit of having a sheet of metal, such as sheet or film 46 or 50, is that it blocks the transmission of electromagnetic waves. The metal films 46 and 50 deposited on sheets 36 and 38 filter out e.m. transmissions both out from the PCB shielded by them, and e.m. transmissions directed in to the PCB. Thus e.m. leakage from the PCB is reduced by the films 46 and 50, which makes it harder for an attacker to listen passively to the e.m. emissions of the PCB in order to try to deduce what it is doing, its structure, and how to attack it.

Furthermore, it is harder for an attacker to direct pulses of e.m. radiation, e.g. microwave, at the PCB in order to look at how the PCB reacts, again with a view to learning information to use in attacking the PCB.

Furthermore, it also makes it harder for an attacker to X-ray the PCI card 10 to determine structural information. It is difficult to get depth information out of X-ray pictures, and having one or more sheets of metal will achieve some observation of features in X-ray. It will be appreciated that the Faraday Cage e.m. screening effect and X-ray blocking effect can be achieved by a single sheet of metal, but that having two sheets gives a better effect, and the spaced different potential sheets can be used to detect punctures with a conductive article as well.

A continuous film of copper, or other conductive metal or material, is preferred because there are no gaps. It is known to enclose electronic components in a metal mesh cage to screen out e.m. transmissions. However high frequency waves can still get through the holes in a mesh. A continuous sheet does not have this problem.

Figure 6:
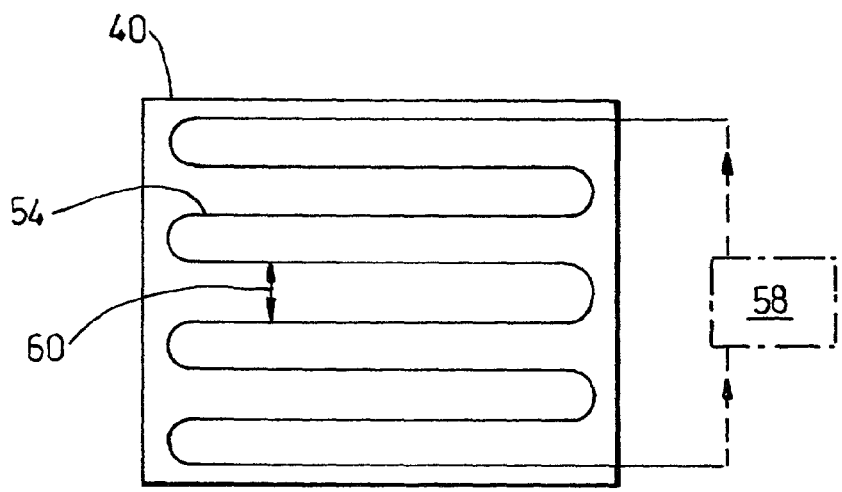

FIGS. 4A and 4B also show layer 40. Layer 40 comprises another flexible sheet of Mylar having on its upper surface a meandering "trip wire" or tell-tale 56. The trip wire 56 is a printed track, trace or film of metal deposited onto the surface of the layer 40. The arrangement is best illustrated in FIG. 6. A voltage is applied, in use, to the trip wire 52 by a trip-integrity verifier module 58 which checks that the voltage detected in the trip wire 56 is the expected voltage. In one example a constant DC voltage, say, 5V, is applied to the trip 56. If an attacker breaks the trip wire 56 the voltage will not be as expected and the fact that an attack has taken place can be established.

A typical metal track width could be about $3/1000$ of an inch, or about $6/1000$ of an inch, and these figures could be typical inter-track distances as well.

In a more sophisticated variant the module 58 sends a rapidly changing known, but unpredictable signal down the trip wire 54 and compares whether the signal that is received matches that which was emitted (with possible expected losses), and if it is not what is expected this is an indication of tampering. The approach makes it much harder for an attacker to clamp the wire to a fixed voltage either side of a portion of the wire to be broken to try to create a bridge past a break point. Even if an attacker tries to connect a bridge to transmit the fluctuating signals, instead of clamping to a fixed voltage, they will still have problems since the fluctuating signal is unpredictable (e.g. random, pseudo-random, or noise-like). This is especially so if the module 58 monitors parameters such as the time between data points in the emitted and detected signals, the time of flight of the emitted signal (longer lengths of wire, i.e. a bridge, would take longer to be traversed), for example phase differences can be used to check for a longer wire; the resistance and/or impedance of the trip wire (bridging a portion prior to breaking the bridged portion would probably alter the resistance and/or impedance), or the loss in the signal (a bridge is likely to alter the losses in received signal).

FIG. 6 shows only a small portion of the total surface area of the Mylar sheet 40 covered by the metal trace that is the wire 54. This is schematic and in practice whilst a thin wire such as is drawn with relatively wide gaps between adjacent spaced portions of the wire a ratio of about ½ of the surface covered with wire material and ½ of the surface as "gaps" between the wire may be preferred. It may be preferred to deposit a narrow metal tape which has a significant width but is still thin enough to be broken (break transmission of signals) in the event of a drill attack. It is preferred that the width of the trip wire be about as wide as the spacing 60 of one part of the trip wire from another generally parallel portion of the trip wire adjacent the one portion. The width of the wire/track may be about $6/1000$ of an inch, as may be the spacing between adjacent convolutions of the wire.

Figure 7:
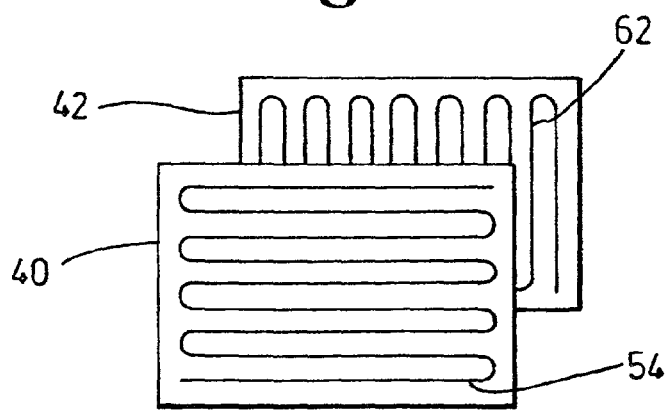

Layer 42 is very similar to layer 40, except that its meandering trip wire, referred 62, has its main elongate orientation direction at a different angle to that of layer 40. As shown in FIG. 7 the conductive paths of the trips wires 54 and 62 are crossed, in this example substantially at right angles. The effect of superposing two crossed meanderline trip wire traces is to create, effectively, a grid of trip wires. An attacker trying to drill or pierce the sheet 32 has to try to avoid the grid of trip wires.

Figure 8:
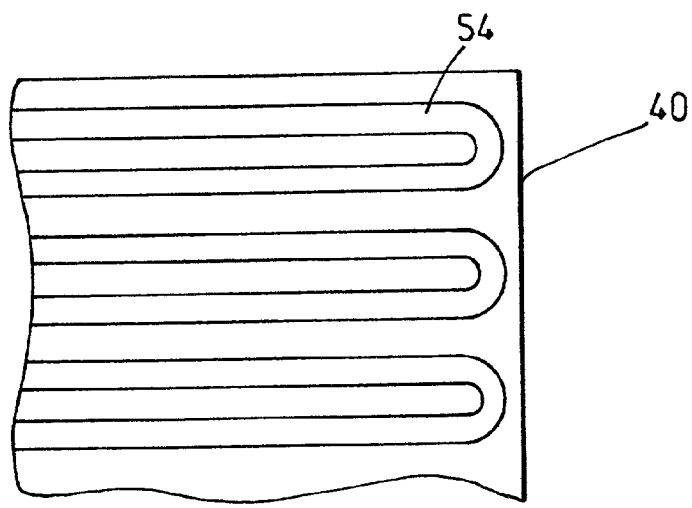

FIG. 8 shows the trip wire trace 54 more accurately. About half of the surface area of the layer 40 is covered with metal track and about half is uncoated (the pattern of course extends over substantially the whole area of the layer (or at least that part of the layer that overlies the PCB).

Figures 9A, 9B:
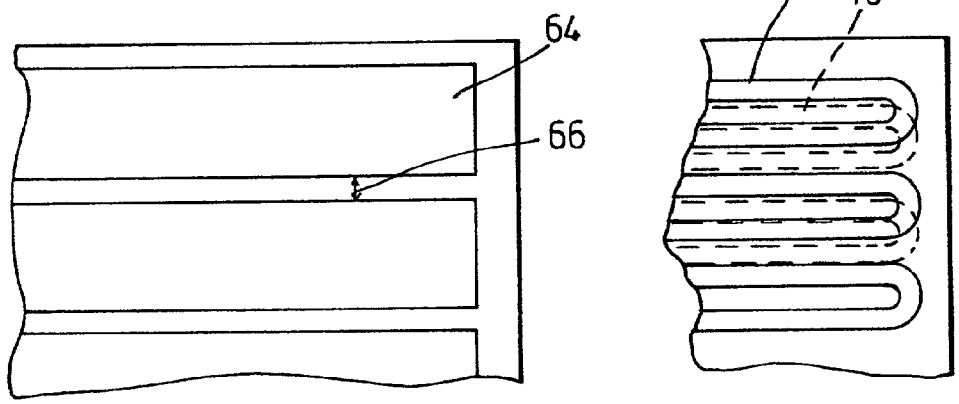

FIG. 9a shows another pattern of metal/conducting deposits on a flexible sheet (e.g. Mylar). This time there are relatively wide block 64 of metal with gaps 66 that are narrower than the metal. The metal blocks 64 may be at different electrical potentials and a metal drill could bridge them, shorting them. Having wide bands instead of narrow tracks makes it less likely that a drill will completely sever a track, and completely interrupt a signal being transmitted via the track, but it makes it more likely that the drill will contact a band and not be wholly in a space between bands. It is then necessary to notice that there is not the same track as before. One possibility is that interfering with the area covered by a track may alter its capacitance, or may alter its ability to carry a standing wave, or may alter its natural resonant frequency, or may degrade the signal it carries. Detecting these changes may result in detecting an attack. Once an attack is detected this fact could be used in tamper-evident mode (e.g. reporting the attack) or tamper-resistant mode (e.g. shutting down the protected electronic component).

Figure 10:
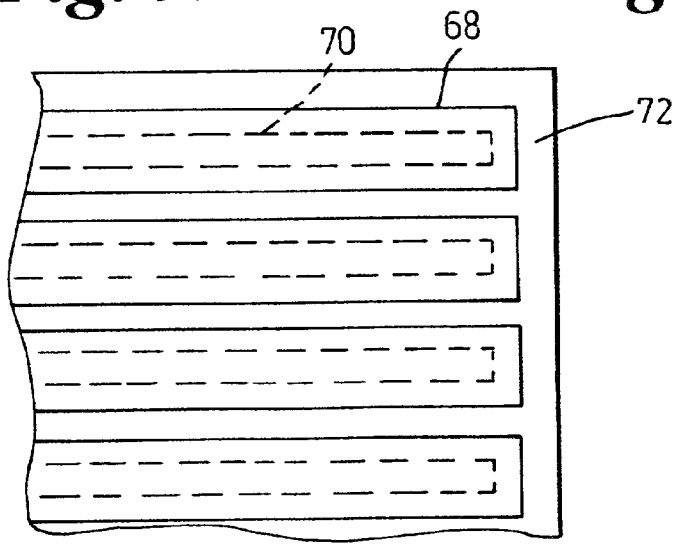

FIG. 10 shows another modification for a possible layer in a protective sheet. In this example two trip wires 68 and 70 are provided, with wire 68 following a convoluted meandering path on the surface of Mylar sheet 72, and with trip wire 70 following the path of wire 68 but spaced a distance from it.

The two wires 68 and 70 are at different base voltages and carry modulated signals (possibly with different modulation patterns or sequences). If one wire is broken the loss of the correct modulation/the loss of one modulated signal is detected. If a conductive member (e.g. metal drill) contacts both wires it can cause a short circuit between the wires (because they are at different voltages) and this can be detected.

A problem with regular repeating patterns for the trip wires 54 and 62 is that an attacker may be able to predict where the gaps between trip wires are located: where they can drill in without breaking a trip wire. One solution is to have more layers of trip wires so as to fill in the plan projected area with trip wires, so that no, or substantially no straight through line large enough for a drill exists. One approach to this is to have a third trip wire layer. This may have its axial direction at a different direction to the other trip wires, say at 45° to the main direction of the wires in the layers 40 and 42. Further trip wire layers may be provided, possibly with the direction of the trip wires extending either (i) in a different direction to the wire of other layers, or (ii) with the trip wire miss-aligned with another layer/other layers so that the trip wires are not exactly superposed. FIG. 9B shows this. In solid line is one layer of wires or tape 74, and in dotted line a linearly shifted additional layer of similar wires or tape 76. It is an effective way of obtaining good projected area cover with relatively few layers. 100%, or effectively 100% cover of projected plan area could be achieved using only two layers, but 3 layers may give added security.

Figure 11:
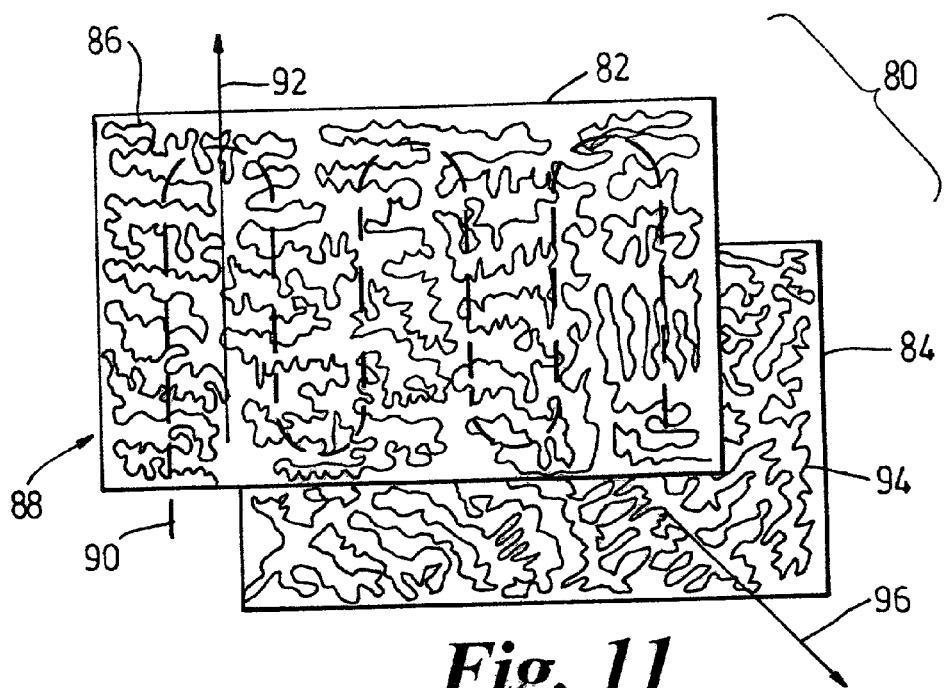

Another answer to the problem of being able to predict where gaps in the trip wire coverage occur is to have the trip wire have a non-regular path. FIG. 11 shows alternative embodiment protective Mylar sheet 80 having two layers: a first layer 82 and a second layer 84. The first layer has a winding, meandering, convoluted track 86 of metal printed on it. The track is shown schematically and is a space-filling fractal pattern 88, in this example of the Peano family of space-filling curves. About half of the surface area of the sheet 80 is overlaid with metal track, and about half of the surface area is track-free (and serves to keep portions of the track separate and insulated from each other).

It will be noted that the fractal pattern 88 has a general path direction, shown as dotted line 90 in FIG. 11, and that this too wanders over the area of the sheet 82 to fill it. Arrow 92 shows the general linear direction of the pattern.

Layer 84 also has another trip wire track 94 which follows a Peano space filling curve, not exactly the same as that of layer 82, but broadly similar. It too has a general direction 96 which in this example is aligned at about 45° to that of layer 82.

Even if an attacker has engineering drawings of the protective sheet 80 it is still difficult to find a straight through drill line which will not break or touch a trip wire.

Figure 12A:
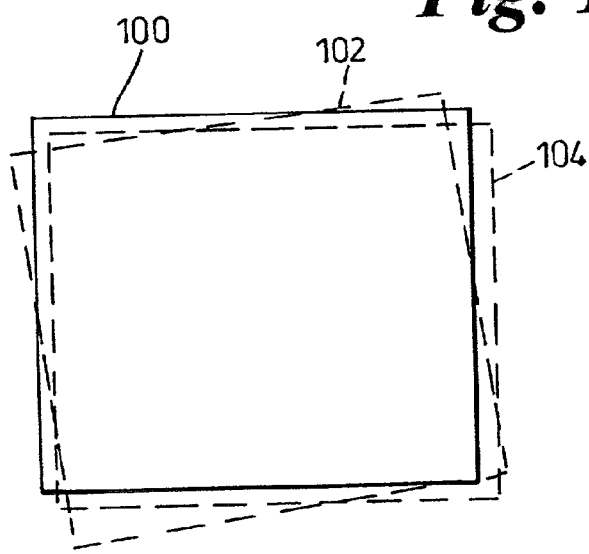
FIG. 12A shows the unpredictable variation in precise alignment of different sheets.

FIG. 12 illustrates another refinement, with the effect exaggerated for clarity. Three sheets 100, 102, 104, each carrying a wiggling, meandering trip wire track are to be bonded into a single composite multi-layers sheet. The sheets are roughly aligned so that the physical size and shape of the composite sheet is more or less standard, or standard but with significant tolerances, and the sheets 100, 102 and 104 are then bonded together.

Because the alignment of the three sheets 100–104 is not precise, and because the tracks are of the order of a few thousandth of an inch wide, there is great variation between different manufactured composite multi-layered sheets as to where exactly all of the tracks are disposed, and their relative positions. Hand assembly can facilitate this degree of deliberate imprecision, but a machine can be instructed to achieve a similar effect. In this way, perhaps even the manufacturer does not know where the trip wire tracks are with any precision reliable enough to drill into an electronic component protected by the sheet with any certainty of not hitting a wire.

Figure 12B:
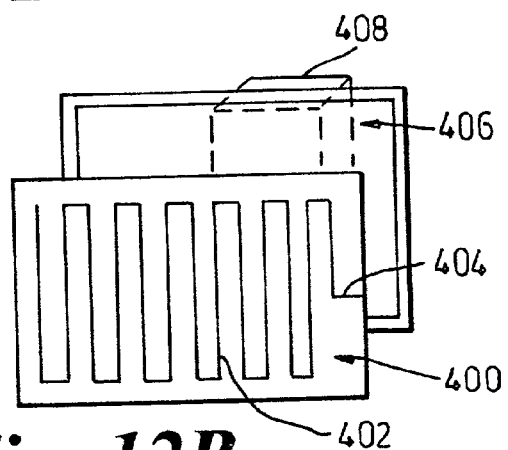
FIG. 12B shows another sheet for use in the invention.

FIG. 12B shows another feature. Sheet 400 comprises a Mylar sheet with a metal antenna 402 printed upon it. A signal injection end 404 of the antenna 402 is connectable to a signal injector device (not shown). A masking signal is input into the antenna during use of the device, the masking signal producing electromagnetic emissions that hide the electromagnetic emissions of a protected electronic component. The e.m. signals from the antenna 402 may be more powerful than those from the protected electronic component (e.g. PCB). They may be in the same general frequency range (or at least overlap the frequency of the e.m. signals emitted by the protected electronic component).

The antenna may emit noise, or a random or pseudo random signal. It may emit a spoof signal which may be taken by an attacker to provide information about the activities of the protected electronic component. It may emit a spoof signal buried in, but extractable from, a background (e.g. noise).

FIG. 12B also shows earth plane sheet 406, similar to sheet 36, between the sheet 400 and the protected electronic component, referenced 408 (and shown schematically). This may be to protect the component from the e.m. signals emitted by the masking layer sheet 400, and/or further hide the signals from the electronic component.

Figure 13:
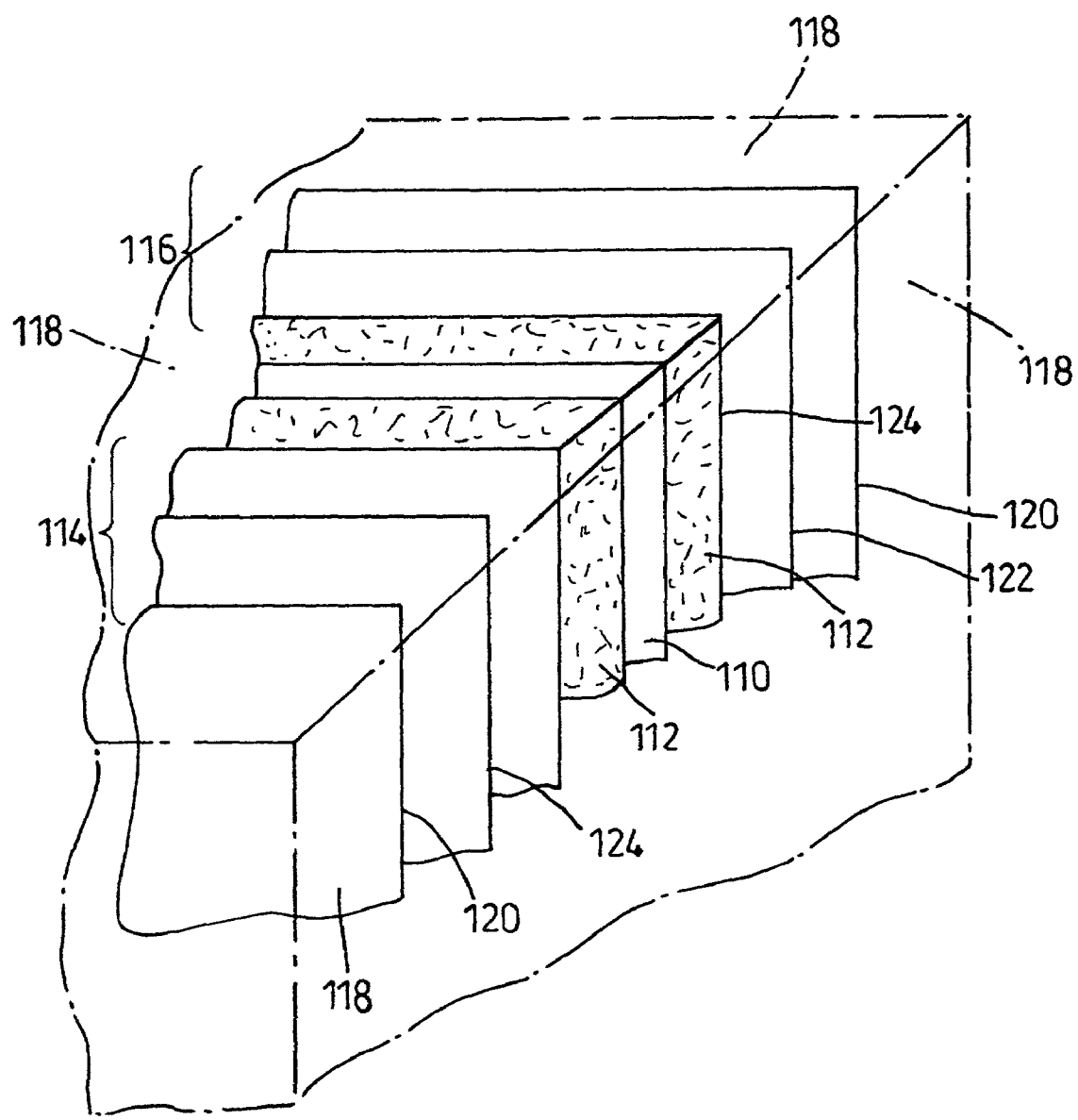
FIG. 13 shows a schematic exploded view of one preferred embodiment of the invention.

FIG. 13 illustrates a preferred embodiment of the invention. A PCB 110 is encapsulated in a solid epoxy encapsulant 112 which is sandwiched between two Mylar sheets 114 and 116. Further epoxy encapsulant 118 surrounds the Mylar sheet/PCB sandwich. Each of the Mylar sheets 114 and 116 is a flexible bonded multi-layer sheet having an outer ground layer 120 similar to layer 36 of FIG. 5, a meandering space-filling fractal wire layer 122 similar to that of layer 82 of FIG. 11, and another meandering space-filling fractal wire layer 124 similar to that of layer 84 of FIG. 11, but with its main direction 96 at about right angles to the main direction 92, of the layer 122.

If a metal probe (e.g. drill) bridges the track 86 on layer 82/122 and the ground plate 120 this can be detected since it will effectively amount to closing a switch on a detection circuit. If either trip wire 86 or 94 is broken the digital signals sent down them, which in this example change tens of thousands of times a second, are not received as expected, which sets off a tamper alarm.

Figure 14A:
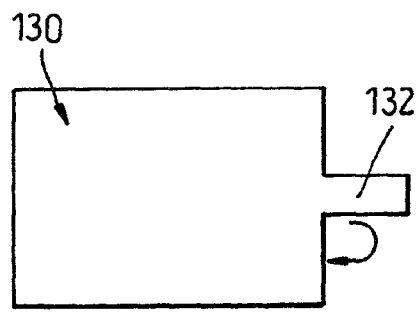
FIGS. 14A to 14C show a detail of how a sheet may be connected electronically to a power supply and/or sensors.
Figure 14C:
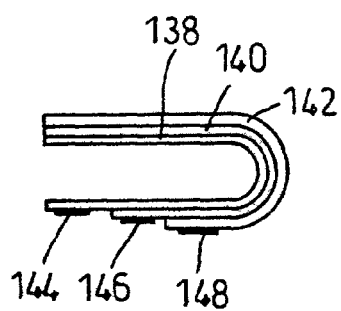
Figure 14B:
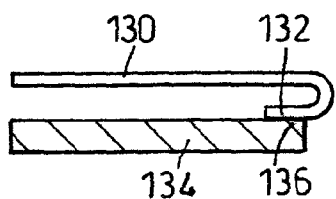

FIGS. 14A to 14C illustrate schematically a feature of a multi-layer Mylar sheet 130. As will be understood, the layers in the sheet 130 which rely upon electronic detection of changes in electrical or electronic parameters or characteristics need to be in communication with appropriate sensors and signal processors. The sheet 130 has a lead or tail 132 provided to do this. Because the sheet is flexible the tail can simply be bent over to contact a PCB board 134. As shown in FIG. 14B, the tail 132 can be bent under the main body of the sheet 130 to contact the PCB 134 at a position 136 that is under the sheet, and that is therefore protected by the sheet.

FIG. 14C shows that the different layers, referenced 138, 140, 142 of the sheet could in the region of the tail stop at different points so as to expose contact regions of the tail to provide spaced contact points 144, 146, 148 for the printed metallic layers on each layer 138, 140, 142.

Figure 15A:
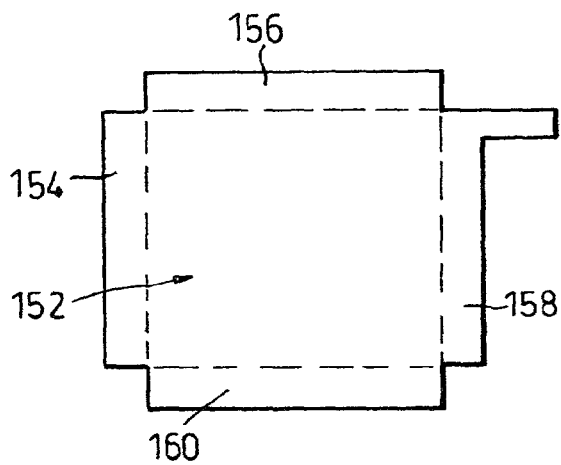
FIGS. 15A to 15C show schematically further detail of an embodiment of the invention.
Figure 15B:
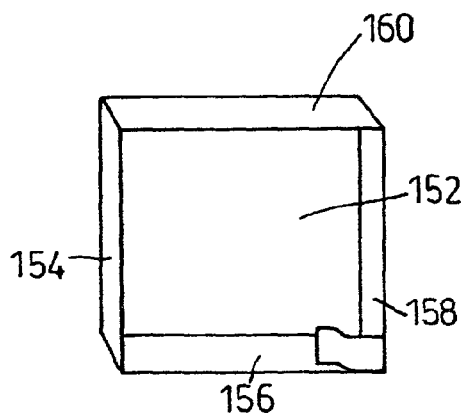
Figure 15C:
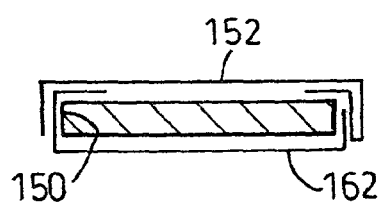

FIGS. 15A to 15C show another refinement. PCB's (and many other electronic components) have a finite thickness and have edge surfaces 150 which could be attacked by an attacker. The flexible protective sheeting 152 is shaped with fold-down flaps 154, 156, 158, 160 which can be bent during manufacture of a protected device. The flaps 154 to 160 are bent or folded down to cover the sides 150 of the PCB. FIG. 15C shows two protective flexible sheets 152 and 162 each of which is shaped into a box-like structure similar to that shown in FIG. 15B, and one box is then nested inside the other fully to surround the PCB.

Of course, instead of effectively having a box made of two separate sheets, the flexible protective sheets could be joined and be a single sheet. The PCB or other device to be protected could be held inside an envelope, pouch, or bag of flexible protective sheet.

Figure 16:
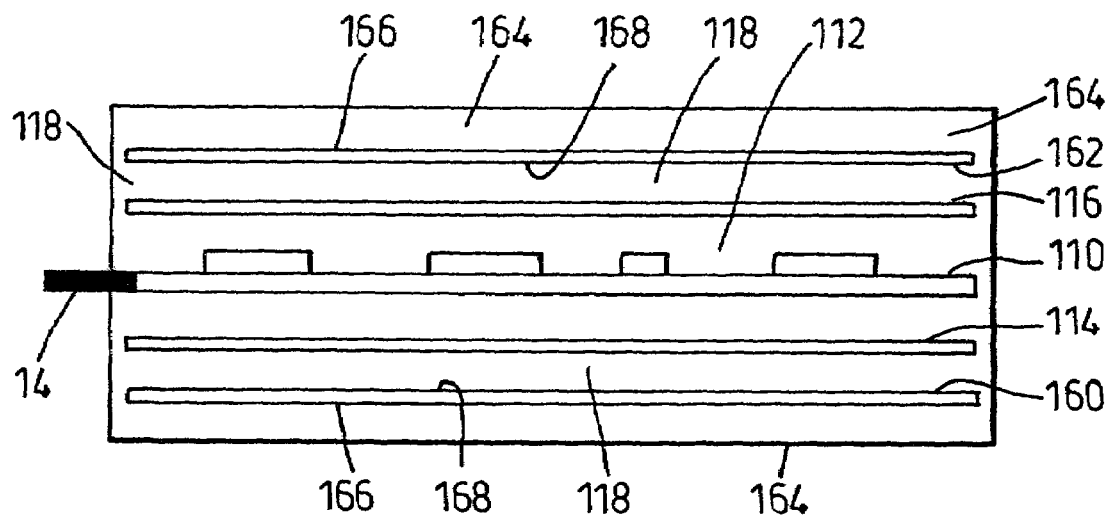
FIGS. 16 to 18 show schematically another preferred embodiment of the invention.
Figure 17:
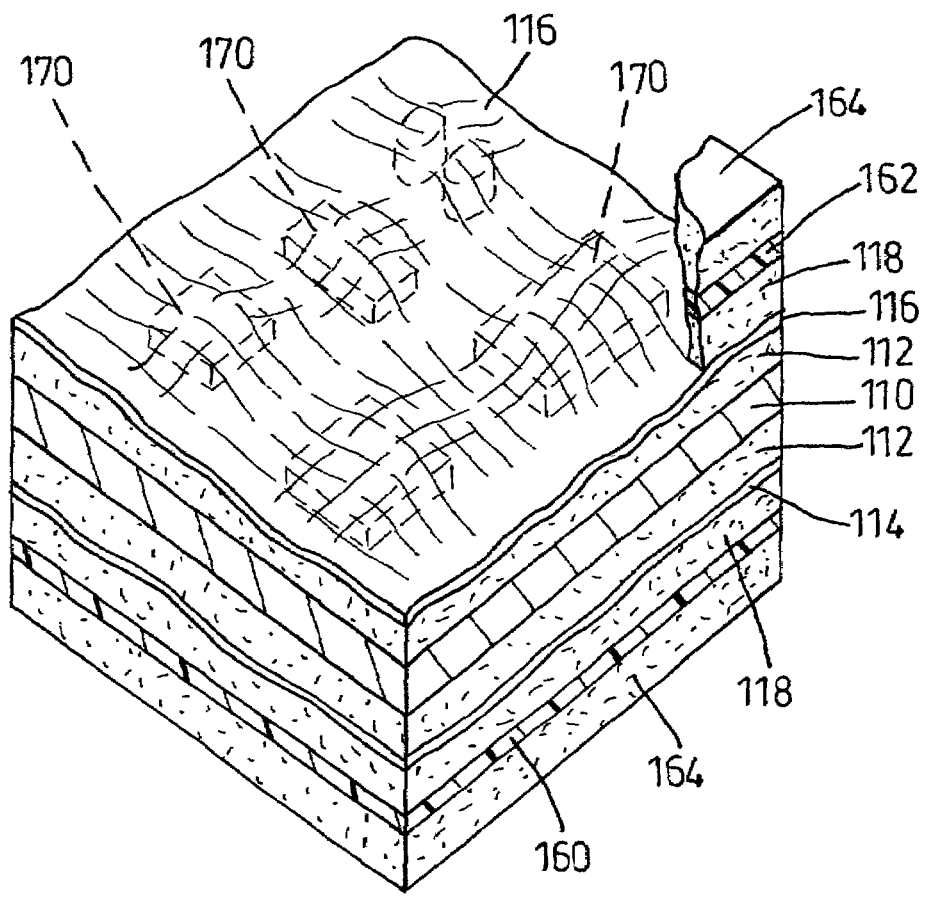
Figure 18:
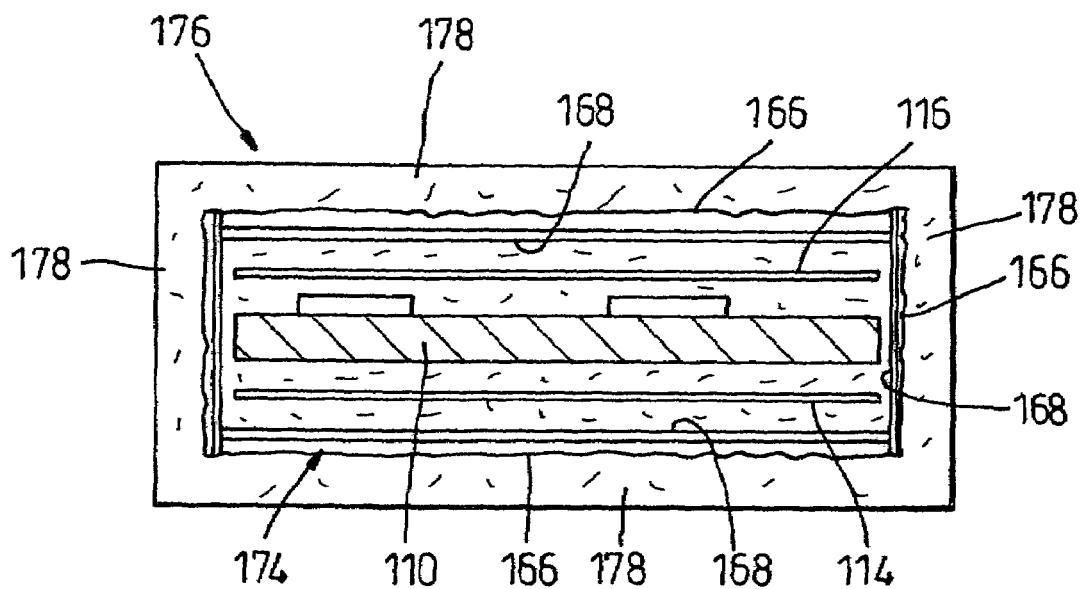

FIG. 16 to 18 show another embodiment of the invention. A PCB 110 is surrounded by black epoxy resin encapsulant 112. A multi-layer flexible Mylar sheet 114 is provided beneath the PCB, and another 116 above it. The sheets 114 and 116 are as described in relation to FIG. 13. Further black epoxy encapsulant 118 overlays the sheets 114 and 116. A lower and upper sheet of thin glass 160 and 162 are in contact with the encapsulant 118, and still further black epoxy encapsulant 164 overlies the glass sheets 160 and 162.

The sheets of glass 160 and 162 are about $3/1000$ of an inch thick and are made of untoughend glass which shatters or cracks easily when stressed.

The outer surface 166 of the glass 160, 162 is a diffusive surface, such as an etched surface, and diffuses in use a laser beam to reduce the spatial energy intensity of light transmitted past the diffusive surface. The inner surface 168 of the glass, 160, 162, the one nearer to the PCB, is mirrored: coated with a reflective material. This is to reflect a laser beam that is incident upon it.

FIG. 17 shows another feature of the invention. The microchips and other electronic components mounted on the board 110 are schematically represented in chain dotted outline and are referenced 170. They have a depth and project away from the board 110 itself. The flexible multi-layer Mylar sheet 116 is shown having a non-flat, contoured surface. The sheet 116 forms valleys between projecting electronic components 170 and hills over the components 170. This means that the surface of the sheet 116 is not all in the same plane, and the sheets of electronically conductive trip wires 86 and 94, and the ground planes 46 are also not in any one plane. This can make it difficult to X-ray or otherwise image the conductive electronic tell-tale layers to know where the tamper-evident structures are provided. It also makes it difficult to know where they are working from plans.

Of course, the flexible electronic counter-intrusion sheets 114, 116 could be provided outside of the glass sheets 160, 162, instead of, or as well as, inside them.

FIG. 18 shows side or end plates 172 of thin glass, similar to the top and bottom sheets 162 and 160, and shows that a glass clad module 174 is encased in the encapsulant 164 to form a block 176.

Figure 19:
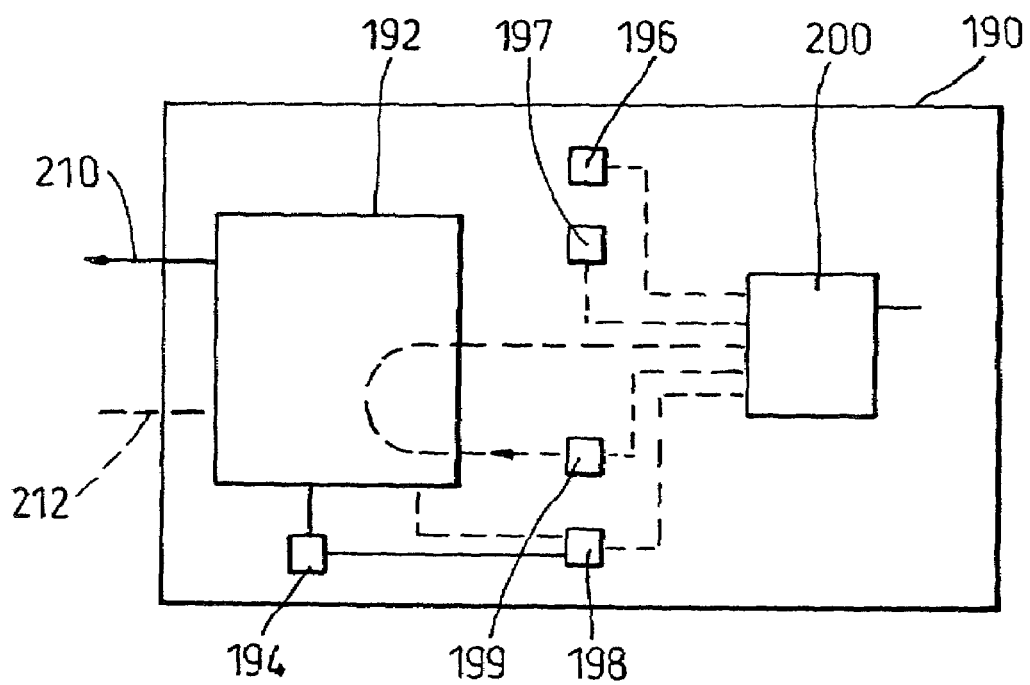
FIG. 19 shows schematically a PCB suitable for protection in using the invention.

FIG. 19 shows details of an alternative PCB board 190 to be protected in accordance with the invention. The board 190 has a Trusted Clock chip 192, a battery 194, board interference sensors 196, 197, 198, a signal injector 199, a PIC chip 200 and an output only line 210. There are no external inputs to the PCB 190: it simply sends out a timestamp signal via line 210. It may do this periodically, e.g. once every second, or every minute, or for example, every 1/100 of a second. Alternatively there may be an input to the chip 210, referenced 212, for example in order to correct its clock for drift.

Sensor 196 is a temperature sensor, such as a thermister. This senses the temperature at the chip and either provides that to the PIC chip 200 which determines whether it is within allowable bands, or compares the signal from sensor 196 with a reference temperature signal and checks that they are close enough, within an allowable range. This can detect overheating (e.g. due to laser attack), or cooling (e.g. sub zero ° C. cooling). Sensor 197 is a vibration sensor and/or orientation sensor (possibly an electronic gyroscope) which sends signals to the chip 192 which checks if untoward vibration and/or re-orientating of the PCB has taken place. Sensor 128 is a power supply sensor which senses the power supply to the chip 192 and/or chip 200 and provides signals indicative of power supply characteristics to the chip 200 which uses them, possibly in combination with a reference power supply signal, to determine whether the power supply to chip 192 and/or itself is being altered or perturbed. Signal injector 199 generates known signals of known characteristics, and introduces them to parts of the PCB. Those known generated signals are fed back to the chip 200 where a comparator compares the injected signals with the returned signals and if the match is not what was expected this is indicative of a problem, and that the Trusted Clock may have been compromised and is unsafe. The injected signals may constitute guard signals transmitted over a guard network or guard wire where breaking the wire (e.g. with a drill) blocks the transmission of the guard signals. Alternatively or additionally the injected signals may be injected into the chip 192 itself and may be influenced by attacks on the clip 192. The injected, or guard, signals may be a fluctuating signal which changes rapidly in a known way. For example it may be a digital signal that is altered thousands of times a second.

It will be appreciated that upon detection of a non-allowable event the chip 200 may instruct the Trusted Clock chip 192 not to produce any more time signals, and/or it may emit an alarm signal, and/or it may note the event in an internal memory, a memory on the PCB, or an external memory (or it may record the event in more than one memory). The alarm signal may be transmitted via output 210, or possibly via a wireless alarm emitter provided on the PCB 190.

It will be appreciated that the inputs to the chip 200 will also include a sensor sensing whether a signal has been detected from a sensing element on a flexible protection layer of an overlaying protective sheet, similar to sheet 114 or 116. For example, the signal injector 129 provides signals to the meandering trip wire layers 82 and 84 of the flexible sheeting, and a sensor senses whether any current flows to the grounding layer 46 of the sheeting. The PCB board will typically have sheets such as sheets 114 and 116 both above it and below it.

To produce the module 174 of FIG. 18 the sheets of glass and the sheets of flexible protective plastics with embedded circuitry, and the PCB are held in place with their relative positions established and the epoxy polymer material 112 and 118 (which comprises the same black epoxy) is injected between the PCB and the Mylar sheets 114, 116 and between the Mylar sheets the glass plates, and also around the glass plates. The epoxy then sets.

When forming the module 174 there may be tamper-evident sheet support surfaces, or plates, provided to support the tamper-evident sheet (e.g. thin glass sheet) laterally as the epoxy or other encapsulant is introduced between the electronic component and the tamper-evident sheet. The support surface and the tamper-evident sheet may be in face-to-face contact as the encapsulant is injected/introduced. This enables thinner sheets of glass or other tamper-evident material to be used than would otherwise be the case since they do not have to withstand the lateral forces applied by the encapsulant unaided. The support surfaces may remain in contact with the face of the tamper-evident sheet whilst the epoxy/encapsulant beneath the sheet cures (this can also cause stress/strain in the sheet). The temperature of the module 174 and the support surfaces may be controlled during curing of the encapsulant, for example to avoid too-rapid cooling which may put too great a strain on the thin tamper-evident sheet: in order to avoid thermal shock from breaking the tamper-evident sheet.

Figure 20:
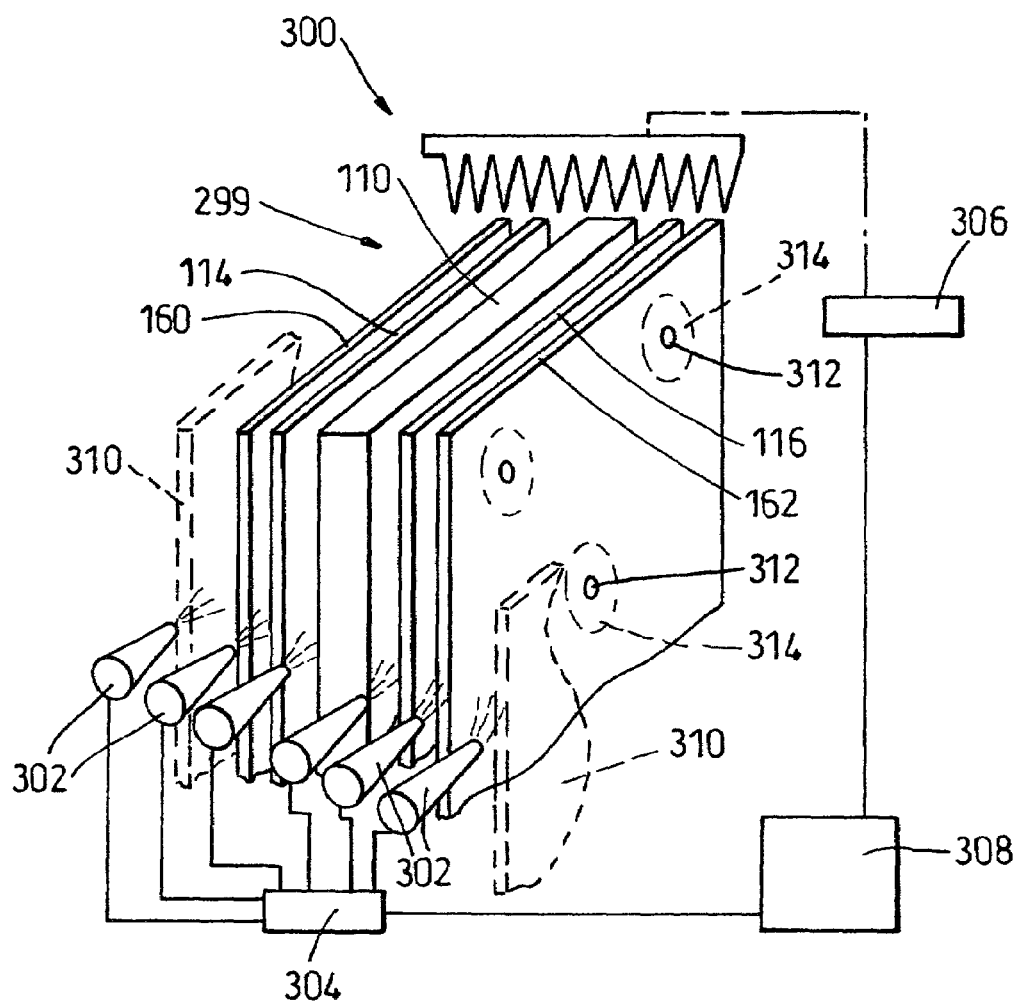
FIG. 20 shows schematically a way of making the embodiment of the invention, and apparatus for making the embodiments.

FIG. 20 shows schematically a manufacturing apparatus 299 comprising positioning rig 300, epoxy dispense nozzles 302, an epoxy dispense system 304, a positioning rig control system 306, and a control processor 308. The control processor controls the movement and operation of the positioning rig 300 and the epoxy dispense system 204. Mould walls 310 are used to define the outer surfaces of the block 176 of encapsulant that surrounds the module, as seen in FIG. 18.

It may be necessary to form the module 174 of FIG. 18 first, before encapsulating that module with epoxy to create the block 176 of FIG. 18.

The dispense nozzles 202 may be movable. There may be some dispense nozzles which are used to form the module 174, and some that are used to introduce the material of the encapsulant that forms the outer positions of the bock 176, portions referenced 178 in FIG. 18.

FIG. 20 shows a possible advantageous feature. One or more of the glass or flexible sheets may have a through hole or holes 312 extending through them which allow epoxy under pressure to pass through. This may help to key the Mylar sheet, or glass plate, to the body of epoxy that is beneath it.

It also alleviates the need to be too precise in the amount of epoxy that is pumped in, and the flow rate of epoxy, since the hole(s) effectively provide an overflow escape route for excess epoxy. FIG. 20 shows schematically at 314 such flowed-through epoxy which effectively become patches of epoxy on the outer side of the glass sheets (or Mylar sheets if they are holed). Walls 310 may have such epoxy-escape channels.

Alternatively another excess epoxy escape channel mechanism may be provided to remove the need to control the volume and rheological properties of the epoxy too closely.

The glass plates and/or the Mylar sheets may be held relatively imprecisely in position, possibly with a degree of movement in their position. This may be used to accommodate encapsulant-injection problems.

It will be appreciated that the PCB may be exposed to conditions before its in-situ use in an electronic device, when the electronic device is itself in its final phase of use, which would be outside of the parameters set for triggering an attack alarm. For example if a device is left in an unheated warehouse it could get as cold as −20° C., and a device may be vibrated and re-orientated during transport. For this reason the PCB, or the PIC chip, could have an activation trigger which can be activated when the device is ready for use, after unusual installation conditions have already occurred.

It will also be appreciated that one business model for using the invention is that a Trusted Organisation (someone who is likely to be believed) may allow a customer, person or company to take possession of one of their Trusted Clock Modules on condition that they do not tamper with it, and the customer uses the Trusted Clock Module to timestamp documents. Periodically (e.g. once every year or every 6 months) the Trusted Organisation may inspect the Trusted Clock Module for signs of tampering and if no sign is found the data or documents timestamped by that Trusted Clock Module in the foregoing period can be trusted to have the correct timestamp. If the Trusted Clock Module is found to have a sign consistent with tampering then the timestamps that it has made since it was last checked may be suspect. Some action may be taken against a customer who has permitted their module to be tampered with, or some warning given to them.

Of course, the Trusted Clock Module could be inspected or investigated for signs of tampering at any time: it is not necessary to wait for the predetermined pre-planned inspection times. Indeed, there may be no pre-scheduled inspection timetable: the module could simply be checked for tampering by a Trusted Person/the Trusted Organisation upon demand.

It will also be appreciated that a network, such as a LAN or WAN, could share a Trusted Clock Module without needing Internet access to it.

It will be appreciated that the Mylar layers of a multi-layer sheet should be thick enough to support the metal tracks or formations deposited on them, and thick enough to insulate electrically one layer of metal formations from another layer of metal formations.

What we claim is:

1. A tamper-evident and/or tamper-resistant electronic module comprising an electronic component, a tamper-evident and/or tamper-resistant sheet, and encapsulant material, said component being encapsulated in said encapsulant material, said sheet overlying said component, said sheet comprising a multi-layer sheet, said tamper-evident and/or tamper-resistant sheet being encapsulated in said encapsulant material, and said encapsulant material being opaque so that said tamper-evident and/or tamper-resistant sheet cannot be seen, a plurality of said layers of said sheet being selected from the groups:

(i) an electromagnetic radiation shield layer;
   (ii) a tell-tale electrically conductive trip wire defining a convoluted meandering pathway on said layer, said trip wire meandering in a pattern which substantially covers said electronic component in a space filled area of said layer;
   (iii) a layer having the features of (ii), and in which the pathway comprises a fractal pattern;
   (iv) a layer having the features of (ii), and in which a second tell-tale trip wire extends alongside a first tell-tale trip wire so that they meander as a spaced pair.
   (v) an active electromagnetic masking emission layer adapted to emit electromagnetic radiation.

2. A module according to claim 1 wherein said layers are of a flexible electrically insulating plastics material and said shield and/or pathways are electrically conductive coatings or regions carried by said flexible plastics material.

3. A module according to claim 2 wherein said shield and/or pathways are printed onto said layers.

4. A module according to claim 1 wherein said tamper-evident and/or tamper-resistant sheet has one or more layers selected from group (ii) to (iv) sandwiched between two layers from the group (i).

5. A module according to claim 4 wherein said sheet has at least two layers in accordance with any of groups (ii) to (iv), with the meandering pathway of one layer being displaced when viewed in plan from the pathways of the other layer so that as seen in plan projection the pathways of said one and said other layers overlie, at least in part, different parts of the plan area of said component, and wherein said one layer and said other layer are sandwiched between two layers from group (i).

6. A module according to claim 1 wherein said sheet has an undulating, contoured, shape so that a said layer is not disposed in a precisely flat plane.

7. A module according to claim 6 wherein said sheet is encapsulated in said encapsulant which defines a body having a surface, and wherein at different regions of said body selected said layer is at different depths within said body from said surface.

8. A module according to claim 7 wherein said component has projecting hill portions and valley portions between said projecting hill portions, and wherein said sheet undulates with hills and valleys complementary to said hill and valley portions of said component.

9. A module according to claim 1 wherein a first said tamper-evident and/or tamper-resistant sheets extends above said component, and a second of said tamper-evident and/or tamper resistant sheets extends below said component.

10. A module according to claim 9 wherein said first and second sheets are separate sheets.

11. A module according to claim 10 wherein said first and second sheets are made separately and do not have identical layer structures.

12. A module according to claim 9 wherein said first and second sheets have main body portions having a generally flat shape and wherein side portions of tamper-evident and/or tamper-resistant sheets extend between said main body portions of said first and second sheet transversely to the main body portions, so as to extend over side regions of said electronic component.

13. A module according to claim 12 wherein said component is substantially enclosed in a container of said tamper-evident and/or tamper-resistant sheet.

14. A module according to claim 1 wherein a power supply is encapsulated within said encapsulant and at least one sensor is provided to monitor at least one layer in order to determine whether an expected condition or signal is observed by said sensor.

15. A module according to claim 14 wherein said component comprises a printed circuit board.

16. A module according to claim 15 wherein said printed circuit board has a clock and is adapted to timestamp data, and has a control processor, and wherein said processor is adapted to generate a tamper-signal upon detection of a tampering signal from one of said layers.

17. A module according to claim 16 wherein said control processor is adapted to perform one or more of the actions:
  (i) stop providing timestamp signals;
  (ii) issue a tamper alarm;
  (iii) record in a memory the occurrence of a tamper event;
upon the generation of said tamper-signal.

18. A module according to claim 1 wherein a thin sheet of frangible material is embedded in said encapsulant overlaying said component, said sheet of frangible material being of such thickness that it crack or breaks if an attempt is made to drill or cut through it with a laser drill.

19. A module according to claim 18 wherein said sheet of frangible material has at least one of: (i) a diffusive layer adapted in use to diffuse a laser beam so as to reduce the energy intensity of the light which passes through said frangible sheet; (ii) a reflective layer adapted in use to reflect at least a substantial part of the light of an incident laser beam.

20. A module according to claim 1, the module having a PCI card configuration.

21. A module according to claim 1 wherein said component comprises one of:
  (i) a timestamping clock adapted to timestamp data; or
  (ii) a PCB having a timestamping clock adapted to timestamp data.

22. A tamper-evident and/or tamper-resistant electronic module comprising an electronic component, a tamper-evident and/or tamper-resistant sheet, and encapsulant material, wherein said component is encapsulated in said encapsulant material and said sheet overlies said component, and wherein said sheet comprises a multi-layer sheet, a plurality of said layers of said sheet being selected from the groups:
  (i) an electromagnetic radiation shield layer;
  (ii) a tell-tale electrically conductive trip wire defining a convoluted meandering pathway on said layer, said trip wire meandering in a pattern which substantially covers said electronic component in a space filled area of said layer;
  (iii) a layer having the features of (ii), and in which the pathway comprises a fractal pattern;
  (iv) a layer having the features of (ii), and in which a second tell-tale trip wire extends alongside a first tell-tale trip wire so that they meander as a spaced pair,
  (v) an active electromagnetic masking emission layer adapted to emit electromagnetic radiation,
wherein said tamper-evident and/or tamper-resistant sheet has one or more layers selected from group (ii) to (iv) sandwiched between two layers from the group (i), and
said sheet has at least two layers in accordance with any of groups (ii) to (iv), with the meandering pathway of one layer being displaced when viewed in plan from the pathways of the other layer so that as seen in plan projection the pathways of said one and said other layers overlie, at least in part, different parts of the plan area of said component, and wherein said one layer and said other layer are sandwiched between two layers from group (i).

* * * * *